US009632633B2

(12) United States Patent
Ma et al.

(10) Patent No.: US 9,632,633 B2
(45) Date of Patent: Apr. 25, 2017

(54) TOUCH PANEL, LIQUID CRYSTAL DISPLAY DEVICE AND SCANNING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Conghua Ma, Shanghai (CN); Lihua Wang, Shanghai (CN); Feng Lu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 263 days.

(21) Appl. No.: 14/308,660

(22) Filed: Jun. 18, 2014

(65) Prior Publication Data

US 2015/0185905 A1    Jul. 2, 2015

(30) Foreign Application Priority Data

Dec. 27, 2013    (CN) .......................... 2013 1 0740771

(51) Int. Cl.
*G06F 3/044*    (2006.01)
*G09G 3/36*    (2006.01)
*G06F 3/041*    (2006.01)
*G06F 3/046*    (2006.01)
*G02F 1/1343*    (2006.01)

(52) U.S. Cl.
CPC .............. *G06F 3/044* (2013.01); *G06F 3/046* (2013.01); *G06F 3/0412* (2013.01); *G09G 3/3648* (2013.01); *G02F 2001/134318* (2013.01); *G06F 2203/04106* (2013.01)

(58) Field of Classification Search
None
See application file for complete search history.

(56) References Cited

U.S. PATENT DOCUMENTS

| | | | | |
|---|---|---|---|---|
| 2011/0316792 A1* | 12/2011 | Huang | ................... | G06F 3/0416 345/173 |
| 2012/0154326 A1* | 6/2012 | Liu | ........................ | G06F 3/0412 345/174 |
| 2014/0078104 A1* | 3/2014 | Lee | .......................... | G06F 3/044 345/174 |

FOREIGN PATENT DOCUMENTS

| | | |
|---|---|---|
| CN | 201616086 U | 10/2010 |
| CN | 102541384 A | 7/2012 |

(Continued)

*Primary Examiner* — Seokyun Moon
*Assistant Examiner* — Douglas Wilson
(74) *Attorney, Agent, or Firm* — Alston & Bird LLP

(57) ABSTRACT

The present invention discloses a touch panel, a liquid crystal display device and a scanning method thereof. The touch panel includes an array substrate including a common electrode layer, wherein the common electrode layer includes an electromagnetic-capacitive composite structure configured to identify touch signals; wherein, the electromagnetic-capacitive composite structure includes a capacitive touch structure and an electromagnetic touch structure. The electromagnetic touch structure and the capacitive touch structure are integrated on the array substrate, so that the thickness and the cost and complexity of the manufacturing of the touch panel and the liquid crystal display device are effectively reduced.

2 Claims, 6 Drawing Sheets

(56) References Cited

FOREIGN PATENT DOCUMENTS

| CN | 102707524 A | 10/2012 |
| CN | 102955639 A | 3/2013 |
| CN | 103218097 A | 7/2013 |

* cited by examiner

TOUCH PANEL, LIQUID CRYSTAL DISPLAY DEVICE AND SCANNING METHOD THEREOF

CROSS-REFERENCES TO RELATED APPLICATIONS

This application claims the benefit of priority to Chinese Patent Application No. 201310740771.X, filed with the Chinese Patent Office on Dec. 27, 2013 and entitled "TOUCH PANEL, LIQUID CRYSTAL DISPLAY DEVICE AND SCANNING METHOD THEREOF", the content of which is incorporated herein by reference in its entirety.

TECHNICAL FIELD

The present invention relates to the field of displays, and more particularly to a touch panel, a liquid crystal display device and a scanning method thereof.

BACKGROUND OF THE INVENTION

A touch panel is an input device that enables a user to directly input a command by selecting command contents displayed on a screen of an image display and the like with a finger or with an object, and when the user is in direct contact with the touch panel with a finger or with the object, the touch panel detects a touch point and drives a liquid crystal display device according to the command of a selected icon to realize specific displaying.

Present touch panels are mainly divided into capacitive touch panels and electromagnetic touch panels according to different working principles: the capacitive touch panels identify touch operations through received touch signals (i.e., electric signals), and the electromagnetic touch panels identify touch operations through received touch signals (i.e., electromagnetic signals from electromagnetic needles). At present, an independent capacitive touch panel is generally assembled on the outer side (i.e., the side facing a viewer) of a liquid crystal display, so as to receive electric signals corresponding to the touch operations; and an independent electromagnetic touch panel is assembled on the outer side of a liquid crystal display or the back of a backlight module.

However, the conventional independent capacitive touch panels and independent electromagnetic touch panels are externally mounted on the liquid crystal display devices, so that the liquid crystal display devices with capacitive and electromagnetic touch functions are relatively thick and relatively complex to be manufactured.

BRIEF SUMMARY OF THE INVENTION

Embodiments of the present invention provide a touch panel, a liquid crystal display device and a scanning method thereof, for solving the problem that a liquid crystal display device is thick in thickness and complex in manufacturing process in prior art.

The embodiments of the present invention provide the following technical solutions.

A touch panel includes an array substrate including a common electrode layer, wherein the common electrode layer includes an electromagnetic-capacitive composite structure configured to identify touch signals; wherein, the electromagnetic-capacitive composite structure includes a capacitive touch structure and an electromagnetic touch structure.

The present invention further provides a liquid crystal display device, including the above touch panel.

A scanning method for a liquid crystal display device, applied to the liquid crystal display device including a capacitive touch structure and an electromagnetic touch structure, and including: performing capacitive touch scanning and electromagnetic touch scanning in a time sharing manner within one frame scanning cycle; or, simultaneously performing electromagnetic touch scanning and display scanning within one frame of scanning cycle.

In an embodiment of the present invention, a touch panel is further provided, including an array substrate, wherein the array substrate includes a common electrode layer, and the common electrode layer includes an electromagnetic-capacitive composite structure configured to identify touch signals; wherein, the electromagnetic-capacitive composite structure includes a capacitive touch structure and an electromagnetic touch structure. According to the technical solutions of the present invention, the electromagnetic touch structure and the capacitive touch structure are integrated on the array substrate, so that the thicknesses of the touch panel and the liquid crystal display device are effectively reduced. Moreover, an electromagnetic screen and a capacitive screen do not need to be manufactured by adopting corresponding processes respectively, so that the manufacturing process of the liquid crystal display device is reduced.

DETAILED DESCRIPTION OF THE PREFERRED EMBODIMENTS

To solve the problems of a relatively thick liquid crystal display device and complexity in manufacturing process in the prior art, an embodiment of the present invention provides a touch panel, including an array substrate, wherein the array substrate includes a common electrode layer, and the common electrode layer includes an electromagnetic-capacitive composite structure configured to identify touch signals; wherein, the electromagnetic-capacitive composite structure includes a capacitive touch structure and an electromagnetic touch structure. By adopting the technical solutions of the present invention, the electromagnetic touch structure and the capacitive touch structure are integrated on the array substrate, so that the thicknesses of the touch panel and the liquid crystal display device are effectively reduced. Moreover, an electromagnetic screen and a capacitive screen do not need to be manufactured by adopting corresponding processes respectively, so that the cost and complexity of manufacturing of the liquid crystal display device is reduced.

The preferred embodiments of the present invention will be illustrated in detail below in conjunction with the accompanying drawings.

Figure 1:
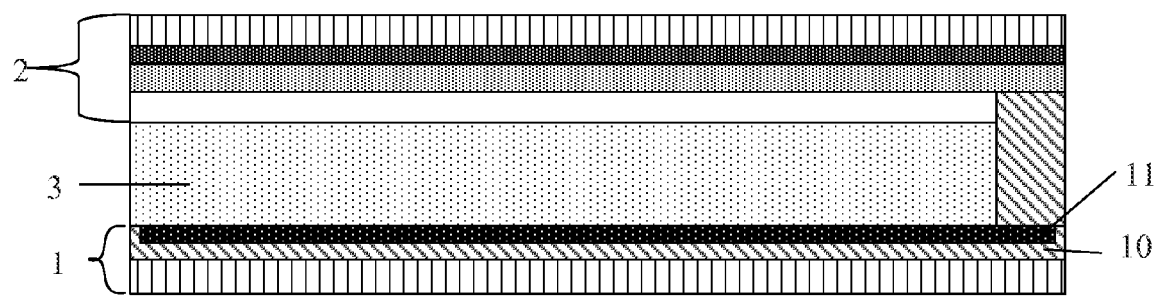
FIG. 1 is a schematic structural diagram of a touch panel according to an embodiment of the present invention.

As shown in FIG. 1, an embodiment of the present invention provides a touch panel, including an array substrate 1, a color filter substrate 2 and liquid crystal molecules sandwiched between the array substrate 1 and the color filter substrate 2. The array substrate 1 include a common electrode layer 10, and the common electrode layer 10 includes an electromagnetic-capacitive composite structure 11 configured to identify touch signals; wherein, the electromagnetic-capacitive composite structure includes a capacitive touch structure and an electromagnetic touch structure.

In an embodiment, the electromagnetic-capacitive composite structure is located in the array substrate 1, so that the touch panel of the embodiment of the present invention has both capacitive touch and electromagnetic touch functions, and then a display device of the embodiment of the present invention has both capacitive touch and electromagnetic touch functions. Compared with a display device with capacitive and electromagnetic touch functions in the prior art, the display device according to the present invention has the advantages of thinner structure and lower power consumption.

Figure 2:
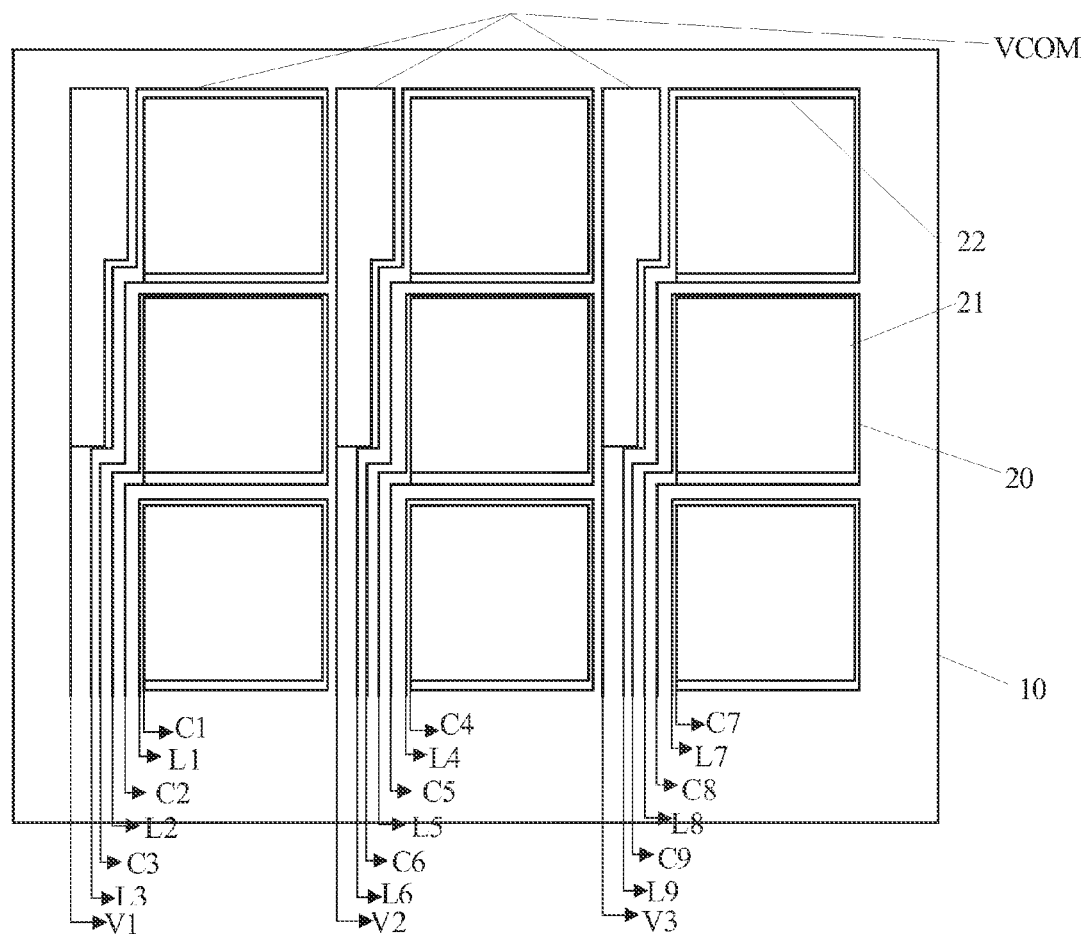
FIG. 2 is a schematic diagram of an electromagnetic-capacitive composite structure according to an embodiment of the present invention.

As shown in FIG. 2, the common electrode layer 10 includes a plurality of common sub-electrodes 20, wherein a self-capacitance electrode 21 is arranged on each common sub-electrode 20, and an electromagnetic coil 22 surrounding each common sub-electrode 20 is arranged outside the common sub-electrode 20. On the above common electrode layer 10, all the common sub-electrodes 20 and the self-capacitance electrodes 21 thereon form a capacitive touch structure, and all the common sub-electrodes 20 and the electromagnetic coils 22 outside form an electromagnetic touch structure.

Alternatively, on the above common electrode layer 10, the shape of each common sub-electrode 20 may be regular or irregular; and preferably, each common sub-electrode 20 is rectangular, and the size of each common sub-electrode 20 matches (is equal to) that of a pixel electrode on the array substrate 1.

On each common sub-electrode 20 of the above common electrode layer 10, the electromagnetic touch structure and the capacitive touch structure may have different structures, specifically as follows.

Figure 3A:
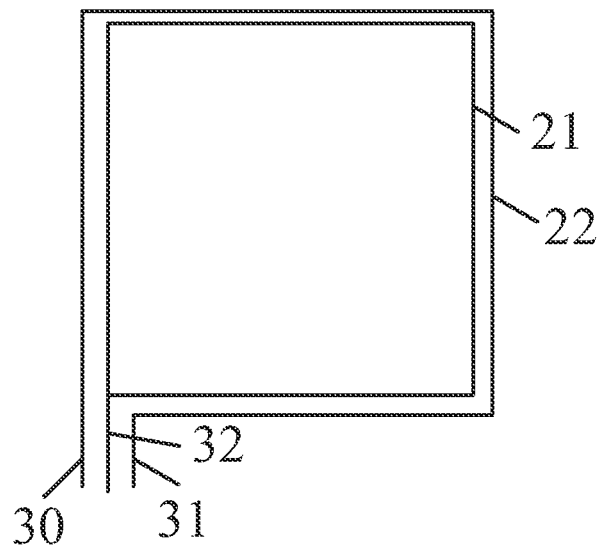
FIG. 3A is a first schematic diagram of an electromagnetic touch structure and a capacitive touch structure on a common sub-electrode according to an embodiment of the present invention.
Figure 3B:
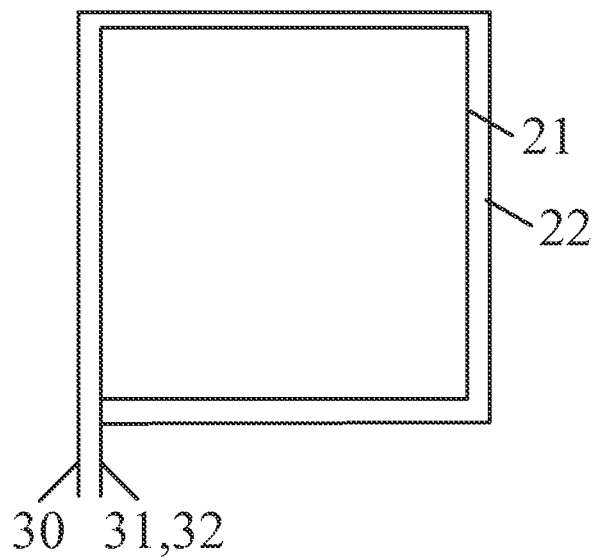
FIG. 3B is a second schematic diagram of an electromagnetic touch structure and a capacitive touch structure on a common sub-electrode according to an embodiment of the present invention.

In one embodiment, the electromagnetic coil 22 has one or more turns around and surrounding a common sub-electrodes 20 clockwise or counterclockwise, the electromagnetic coil 22 surrounding each common sub-electrode includes a start lead 30 and an end lead 31. The self-capacitance electrode 21 is located on the common sub-electrode and includes a lead 32, and the end lead 31 of the electromagnetic coil 22 and the lead 32 of the self-capacitance electrode 21 are not the same lead, as shown in FIG. 3A;

In another embodiment, the electromagnetic coil 22 has one or more turn around and surrounding each common sub-electrode 20 clockwise or counterclockwise, the electromagnetic coil 22 surrounding each common sub-electrode includes a start lead 30 and an end lead 31. The self-capacitance electrode is located on the common sub-electrode, and includes a lead 32, and the end lead 31 of the electromagnetic coil and the lead 32 of the self-capacitance electrode are the same lead, as shown in FIG. 3B.

Figure 4:
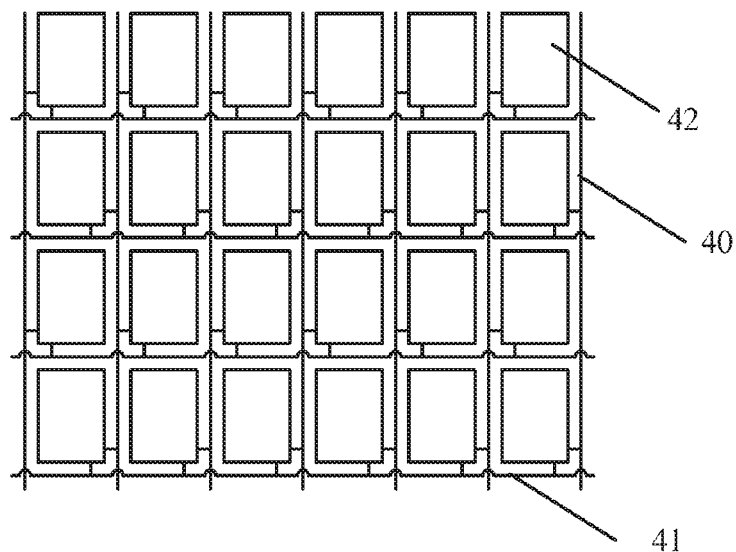
FIG. 4 is a schematic structural diagram of an array substrate according to an embodiment of the present invention.

In the above touch panel including the electromagnetic touch structure and the capacitive touch structure, the array substrate 1 further includes a plurality of pixel electrodes and a plurality of pixel units 42 defined by data lines 40 and scan lines 41, as shown in FIG. 4. To realize capacitive touch and electromagnetic touch functions, the voltage between the common electrode layer 10 and the pixel electrodes needs to be kept. At this moment, at the start of one frame scanning cycle, all the pixel units 42 in the array substrate 1 of the touch panel are charged; and after all the pixel units 42 in the array substrate 1 have been charged, the pixel electrodes are in an off state, that is, the array substrate 1 is turned off, so that the voltage of the pixel electrodes may be changed along with the change of the voltage of the common electrode layer 10. After one frame scanning cycle, the pixel electrodes are in an on state.

In the above process, a charging time of the pixel unit 42 is determined according to the following expression:

the charging time of the pixel unit=(one frame scanning cycle)/(the number of rows of the pixel units of the touch panel).

By the above technical solution, the electromagnetic touch structure and the capacitive touch structure are integrated on the array substrate 1, so that the thickness of the touch panel is effectively reduced. Moreover, when a touch panel including an electromagnetic touch structure and a capacitive touch structure is manufactured in the prior art, because the electromagnetic touch structure and the capacitive touch structure are independent components, the touch panel is manufactured by adopting at least five times of mask process, whereas when the touch panel including the electromagnetic touch structure and the capacitive touch structure is manufactured by adopting the technical solution according to the present invention, the frequency of using the mask process is greatly reduced, so that the complexity of the touch panel manufacturing process is reduced.

Based on the above touch panel, an embodiment of the present invention further provides a liquid crystal display device including the above touch panel. In the liquid crystal display device including a capacitive touch structure and an electromagnetic touch structure, an electromagnetic touch function and a capacitive touch function may be simultaneously realized. In the liquid crystal display device, display scanning, electromagnetic touch scanning and capacitive touch scanning are involved, so that picture display, the electromagnetic touch function and the capacitive touch function are realized.

Figure 5:
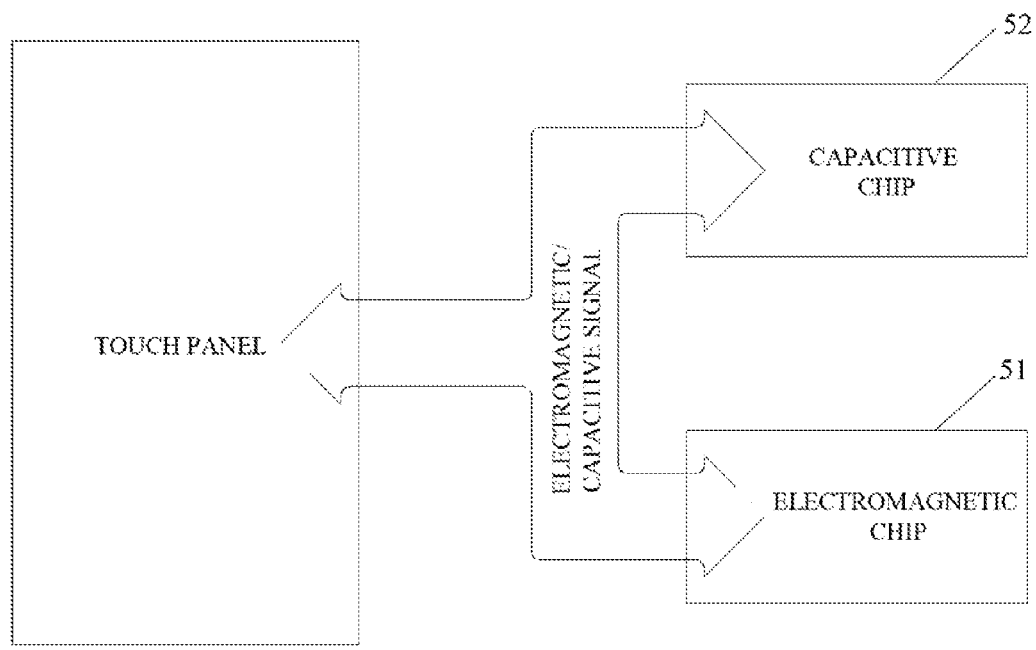
FIG. 5 shows a schematic connection structural diagram of touch panel, an electromagnetic chip and a capacitive chip

FIG. 5 shows a schematic connection structural diagram of touch panel, an electromagnetic chip and a capacitive chip. To realize the electromagnetic touch and the capacitive touch functions, in the above liquid crystal display device, when the liquid crystal display device is in a display state, in the liquid crystal display device start leads 30 and end leads 31 of electromagnetic coils 22 and leads 32 of self-capacitance electrodes 21 are all connected to the common electrode layer 10 of the array substrate 1. When electromagnetic touch scanning is performed, in the liquid crystal display device the start leads 30 and end leads 31 of the electromagnetic coils 22 and the leads 32 of the self-capacitance electrodes 21 are all connected to an electromagnetic chip 51, so that the electromagnetic touch function is realized; and when capacitive touch scanning is performed, in the liquid crystal display device the start leads 30 and end leads 31 of the electromagnetic coils 22 and the leads 32 of the self-capacitance electrodes 21 are all connected to a capacitive chip 52, so that the capacitive touch function is realized.

According to the above liquid crystal display device, the present invention also provides a scanning method for the liquid crystal display device. The method may include: performing capacitive touch scanning and electromagnetic touch scanning in a time sharing manner within one frame scanning cycle; or, simultaneously performing capacitive touch scanning and electromagnetic touch scanning within one frame scanning cycle. The method will be illustrated in detail below in conjunction with the accompanying drawings.

Figure 6:
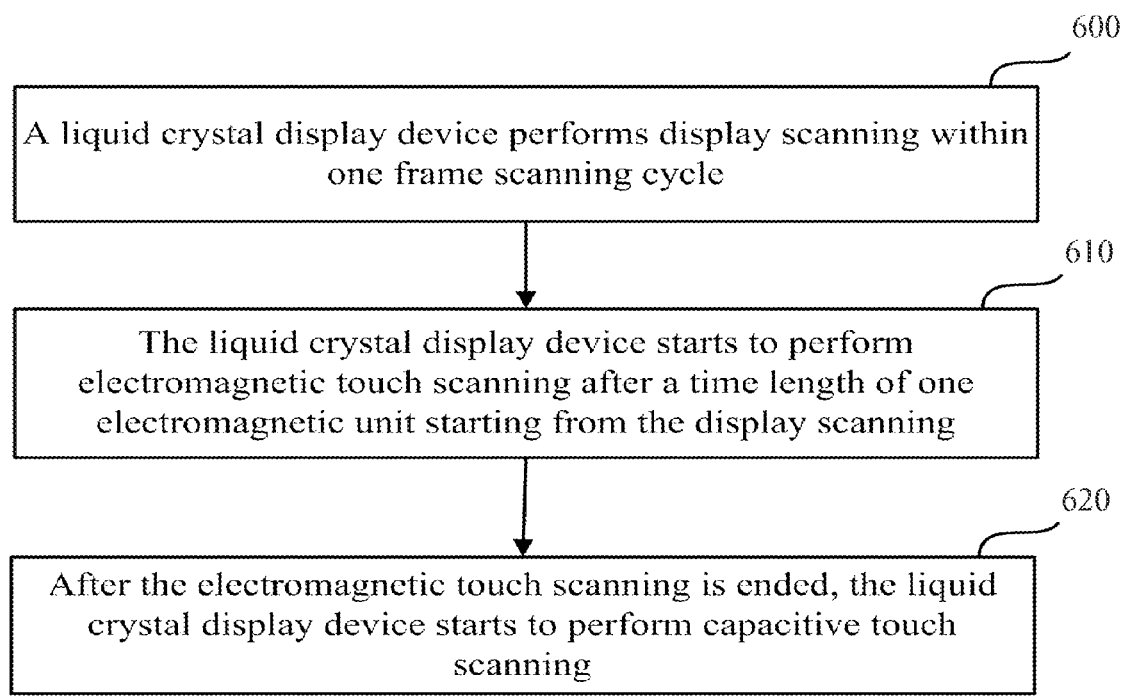
FIG. 6 is a first scanning flow diagram of a liquid crystal display device according to an embodiment of the present invention.

FIG. 6 shows a flow diagram of an exemplary embodiment of an electromagnetic touch scanning and a capacitive touch scanning method. As shown in FIG. 6, when the capacitive touch scanning and the electromagnetic touch scanning are performed in a time sharing manner, the scanning process of the liquid crystal display device is as follows.

At Step 600: the liquid crystal display device performs a display scanning within one frame scanning cycle.

At Step 610: the liquid crystal display device starts to perform an electromagnetic touch scanning after a time length of one electromagnetic unit starting from the display scanning.

Figure 7:
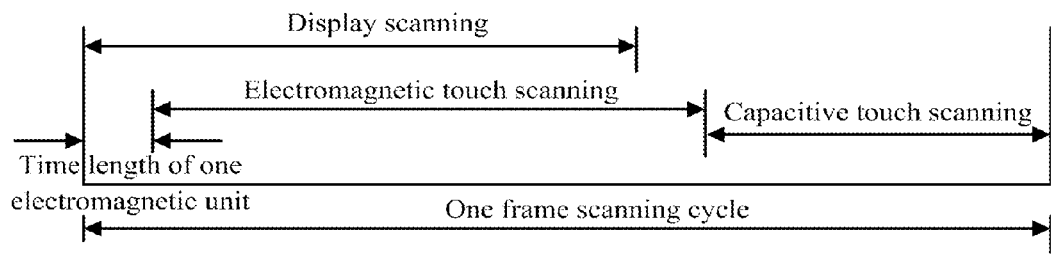
FIG. 7 is a first scanning time sequence diagram of a liquid crystal display device according to an embodiment of the present invention.

In one embodiment of the present invention, as shown in FIG. 7, the electromagnetic touch scanning starts to be performed after a time length of one electromagnetic unit starting from the display scanning, wherein, the display scanning and the electromagnetic touch scanning are simultaneously performed when the display scanning is performed for a time length of one electromagnetic unit till the display scanning is ended.

At Step 620: after the electromagnetic touch scanning is ended, the liquid crystal display device starts to perform the capacitive touch scanning.

In one embodiment of the present invention, as shown in FIG. 7, after the electromagnetic touch scanning is ended, the liquid crystal display device performs the capacitive touch scanning till one frame scanning cycle is ended. Thus, it can be seen that the sum of a time length of the electromagnetic touch scanning, a time length of the capacitive touch scanning and a time length of one electromagnetic unit is equal to one frame scanning cycle.

According to the above technical solution, the display scanning and the electromagnetic scanning are performed at the same time, the liquid crystal display device realizes display by driving liquid crystals to move through an electric field generated by a TFT, and the main medium for data exchange of the electromagnetic touch structure is a magnetic field, so the electromagnetic touch scanning and the display scanning can be simultaneously implemented without affecting the picture display of the liquid crystal display device; and by performing the electromagnetic touch scanning and the capacitive touch scanning in time sharing manner, mutual interference between the two scanning manners may be reduced, so that the accuracy of scanning results and the picture display effect are ensured.

Figure 8:
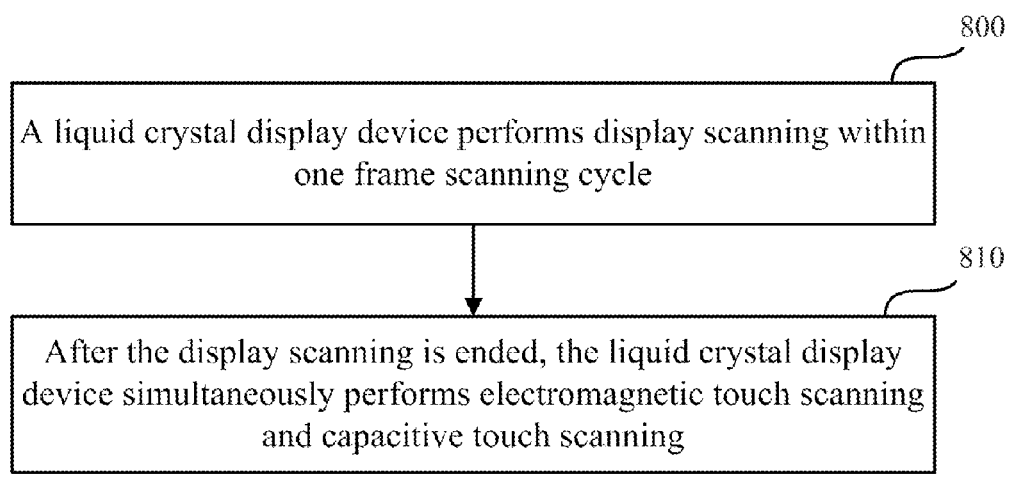
FIG. 8 is a second scanning flow diagram of a liquid crystal display device according to an embodiment of the present invention.

FIG. 8 shows a flow diagram of another exemplary embodiment of an electromagnetic touch scanning and a capacitive touch scanning method. As shown in FIG. 8, when the capacitive touch scanning and the electromagnetic touch scanning are simultaneously performed, the scanning process of the liquid crystal display device is as follows.

At Step 800: the liquid crystal display device performs a display scanning within one frame scanning cycle.

At Step 810: after the display scanning is ended, the liquid crystal display device simultaneously performs the electromagnetic touch scanning and the capacitive touch scanning.

Figure 9:
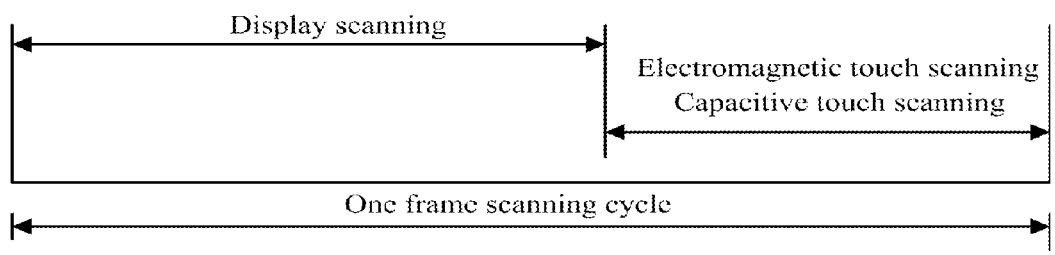
FIG. 9 is a second scanning time sequence diagram of a liquid crystal display device according to an embodiment of the present invention.

In one embodiment of the present invention, as shown in FIG. 9, after the display scanning is ended, the liquid crystal display device simultaneously starts to perform the electromagnetic touch scanning and the capacitive touch scanning till one frame scanning cycle is ended. Thus, it can be seen that a sum of a time length of the electromagnetic touch scanning and a time length of the display scanning is equal to one frame scanning cycle, and a time length of the electromagnetic touch scanning is equal to the time length of the capacitive touch scanning.

Further, when the electromagnetic touch scanning and the capacitive touch scanning are simultaneously performed within one frame scanning cycle, to reduce the interference between the two scanning manners, it may be handled according to the relation between the electromagnetic touch scanning frequency and the capacitive touch scanning frequency under two conditions.

In one condition: when the difference between a frequency of the electromagnetic touch scanning and a frequency of the capacitive touch scanning satisfies a preset range, a liquid crystal display device in which the end lead 31 of the electromagnetic coil 22 outside any common sub-electrode 20 and the lead 32 of the self-capacitance electrode 21 on the common sub-electrode 20 are different leads is adopted, that is, the liquid crystal display device including the touch panel of FIG. 3A is adopted.

In another condition: when the difference between a frequency of the electromagnetic touch scanning and a frequency of the capacitive touch scanning does not satisfy the preset range, a liquid crystal display device in which the end lead 31 of the electromagnetic coil 22 outside any common sub-electrode 20 and the lead 32 of the self-capacitance electrode 21 on the common sub-electrode 20 are different leads is adopted, that is, the liquid crystal display device including the touch panel of FIG. 3A is adopted; or the electromagnetic touch scanning and the capacitive touch scanning are performed in a manner of superposing capacitive touch scanning at a low-frequency and electromagnetic touch scanning at a high-frequency.

In the above process, the preset range is a value preset according to specific conditions.

According to the above technical solution, the touch panels with different structures are adopted respectively according to the frequency of the electromagnetic touch scanning and the frequency of the capacitive touch scanning, thus avoiding the interference among the display scanning, the electromagnetic touch scanning and the capacitive touch scanning in the liquid crystal display device, ensuring the accuracy of the scanning results and improving the picture display effect.

In conclusion, in the embodiments of the present invention, the common electrode layer on the array substrate in the liquid crystal display device is divided, the electromagnetic-capacitive composite structure configured to identify touch signals is integrated on the common electrode layer, and the capacitive touch scanning and the electromagnetic touch scanning are performed in the time sharing manner within one frame scanning cycle, or the capacitive touch scanning and the electromagnetic touch scanning are simultaneously performed within one frame scanning cycle, so that the electromagnetic touch function and the capacitive touch function are simultaneously realized. According to the technical solutions of the present invention, the electromagnetic touch structure and the capacitive touch structure are integrated on the array substrate, so that the thicknesses of the touch panel and the liquid crystal display device are effectively reduced. Moreover, an electromagnetic screen and a capacitive screen do not need to be manufactured by adopting corresponding processes respectively, so that the manufacturing process of the liquid crystal display device is reduced.

Obviously, various modifications and variations could be made to the embodiments of the present invention by those skilled in the art without departing from the spirit and scope of the present invention. Thus, provided that these modifications and variations made to the embodiments of the present invention are within the scope of the claims of the present invention and equivalent technologies thereof, the present invention is intended to cover these modifications and variations.

What is claimed is:

1. A method for scanning a liquid crystal display device having a common electrode layer, which comprises a capacitive touch structure and an electromagnetic touch structure located in a same layer, wherein the electromagnetic touch structure comprises a plurality of electromagnetic coils, each having a start lead and an end lead, and the capacitive touch structure comprises a plurality of self-capacitance electrodes, each having a lead, the method comprising:

performing a display scanning in a frame scanning cycle;

performing a capacitive touch scanning and an electromagnetic touch scanning in a time division manner within the frame scanning cycle, wherein the electromagnetic touch scanning overlaps with the display scanning in time; or, simultaneously performing the electromagnetic touch scanning and the capacitive touch scanning within the frame scanning cycle, wherein the electromagnetic touch scanning and the capacitive touch scanning are performed after the display scanning;

wherein, if the electromagnetic touch scanning and the capacitive touch scanning are simultaneously performed within the frame scanning cycle, the method further comprises:

when a difference between a frequency of the electromagnetic touch scanning and a frequency of the capacitive touch scanning satisfies a preset range, utilizing, for the end lead of the electromagnetic coil, a different lead than the lead of the self-capacitance electrode;

when the difference between the frequency of the electromagnetic touch scanning and the frequency of the capacitive touch scanning does not satisfy the preset range, utilizing, for the end lead of the electromagnetic coil, a different lead than the lead of the self-capacitance electrode; or superimposing the capacitive touch scanning at a low-frequency and the electromagnetic touch scanning at a high-frequency.

2. The method according to claim 1, wherein performing the capacitive touch scanning and the electromagnetic touch scanning in the time sharing manner within the frame scanning cycle further comprises:

starting the electromagnetic touch scanning after display scanning of one electromagnetic unit, wherein the common electrode is divided into a plurality of units, each of the units has electromagnetic function and is defined as the electromagnetic unit;

starting the capacitive touch scanning following the electromagnetic touch scanning.

\* \* \* \* \*